(12) United States Patent
Moll et al.

(10) Patent No.: US 12,271,071 B2
(45) Date of Patent: Apr. 8, 2025

(54) MOTOR VEHICLE HAVING A DISPLAY APPARATUS, AND METHOD FOR ACTIVATING A VIEW PROTECTION DEVICE

(71) Applicant: AUDI AG, Ingolstadt (DE)

(72) Inventors: Tobias Moll, Ingolstadt (DE); Ulrich Müller, Ingolstadt (DE); Roland Sager, Oberhausen (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 18/289,433

(22) PCT Filed: May 4, 2022

(86) PCT No.: PCT/EP2022/062043
§ 371 (c)(1),
(2) Date: Nov. 3, 2023

(87) PCT Pub. No.: WO2022/233970
PCT Pub. Date: Nov. 10, 2022

(65) Prior Publication Data
US 2024/0369867 A1  Nov. 7, 2024

(30) Foreign Application Priority Data

May 5, 2021  (DE) ....................... 10 2021 111624.4

(51) Int. Cl.
*G02F 1/13* (2006.01)
*B60K 35/22* (2024.01)
*B60K 35/29* (2024.01)

(52) U.S. Cl.
CPC ............ *G02F 1/1323* (2013.01); *B60K 35/22* (2024.01); *B60K 35/29* (2024.01);
(Continued)

(58) Field of Classification Search
None
See application file for complete search history.

(56) References Cited

U.S. PATENT DOCUMENTS

| 2009/0067156 A1 | 3/2009 | Bonnett et al. |
| 2020/0118502 A1 | 4/2020 | Hirotsune et al. |

(Continued)

FOREIGN PATENT DOCUMENTS

| DE | 10 2007 001 142 A1 | 8/2007 |
| DE | 10 2013 213 600 A1 | 1/2015 |

(Continued)

OTHER PUBLICATIONS

International Search Report issued in International Application No. PCT/EP2022/062043 dated Sep. 28, 2022.
(Continued)

*Primary Examiner* — Ashok Patel
(74) *Attorney, Agent, or Firm* — STAAS & HALSEY LLP

(57) ABSTRACT

According to a method for activating a privacy device and a motor vehicle having a display device, which may be arranged on a dashboard of the motor vehicle and may include a liquid crystal display screen which may be assigned at least to a front passenger position, the liquid crystal display screen is divided into a plurality of segments. A respective segment includes an electronically switchable privacy device, which is configured in an activated state, to block a display of a display image of the respective segments from the viewing direction of a driver position and to permit the display from the viewing direction of the passenger position, and, in a deactivated state, to permit the display from both viewing directions. The display device is config-
(Continued)

ured to determine the segments on which a moving entertainment content is displayed, and to activate the privacy device for these segments.

11 Claims, 2 Drawing Sheets

(52) U.S. Cl.
CPC ............... *B60K 2360/1523* (2024.01); *B60K 2360/1526* (2024.01); *B60K 2360/195* (2024.01)

(56) References Cited

U.S. PATENT DOCUMENTS

| | | |
|---|---|---|
| 2020/0249504 A1 | 8/2020 | Hopkin et al. |
| 2020/0319512 A1 | 10/2020 | Murzyn et al. |
| 2021/0063783 A1 | 3/2021 | Byoun et al. |

FOREIGN PATENT DOCUMENTS

| | | | |
|---|---|---|---|
| DE | 10 2018 111 344 A1 | | 11/2019 |
| FR | 3 016 722 | | 1/2014 |
| WO | 2008093983 | * | 7/2008 |

OTHER PUBLICATIONS

Written Opinion issued in International Application No. PCT/EP2022/062043 dated Sep. 28, 2022.

English Translation of IPRP (PCT/IB/338 and PCT/IB/373) (Nov. 16, 2023 and Oct. 24, 2023) and the Written Opinion of ISA (PCT/ISA/237) issued in counterpart International Application No. PCT/EP2022/062043 on Sep. 28, 2022 (7 pages).

\* cited by examiner

MOTOR VEHICLE HAVING A DISPLAY APPARATUS, AND METHOD FOR ACTIVATING A VIEW PROTECTION DEVICE

CROSS-REFERENCE TO RELATED APPLICATIONS

This application is a U.S. national stage of International Application No. PCT/EP2022/062043, filed on May 4, 2022, which claims the priority benefit of German Patent Application No. 10 2021 111 624.4 filed on May 5, 2021. Both the International Application and the German Patent Application are incorporated by reference herein in their entirety.

BACKGROUND

1. Field

The examples of the invention relate to a motor vehicle having a display device and a method for activating a privacy device.

2. Description of the Related Art

Display screens having a privacy device, for example, a shutter film or an electronically switchable filter, in which only a display from a viewing direction perpendicular to the display screen is enabled and lateral viewing directions are blocked, are known. The image content can thus be seen not at all or only very strongly darkened if one looks at the display from the side. There are different technologies for this purpose, which execute this effect in a switchable manner.

For example, a display device for a vehicle is known from DE 10 2007 001 142 A1, which includes a display LCD and a control LCD. The control LCD includes transmission switching sections each having three segment units. When the vehicle is traveling, the left two-thirds of the segment units of each transmission switching section are set to a nontransparent state in a section of the control LCD which corresponds to the left display screen half of the display LCD. In a section of the control LCD which corresponds to the right display screen half of the display LCD, in contrast, all segment units are set to a transparent state. An image in the right display screen half is therefore visible from the driver seat, while an image in the left display screen half is invisible from the driver seat. Both images in the right and left display screen halves are visible from a front passenger seat.

An electronic apparatus for controlling a front passenger seat display in front of a passenger who sits on a front passenger seat, and a method for controlling the front passenger seat display are known from US 2021/0063783 A1.

A multifunction device for a vehicle is known from DE 10 2018 111 344 A1. The multifunction device comprises at least one display device and at least one function element, wherein the function element is arranged at least in some regions with respect to a display direction of the display device in such a way from the display device that the function element covers the display device at least in some regions at least in a first operation of the display device along a normal direction of the display device, and a dashboard having such a multifunction device.

Known display devices have the disadvantage that the area to be blocked for the "privacy mode" is always permanently defined, in particular over an entire display screen, and therefore the entire display screen is always darkened for the driver.

SUMMARY

In an example, a motor vehicle having an improved display device is provided.

The examples of the disclosure may be disclosed in the independent claims. Advantageous refinements of the examples may be disclosed in the dependent claims, the following description, and the figures.

In an example, on a display screen of a display device, only those displays are to be hidden for the driver which distract them from a driving task. In order that the display screen is not unnecessarily restricted, it is provided that an activation of the areas of the display screen variable by segment is to be provided, which can be activated or deactivated for the driver.

A motor vehicle having a display device is provided by the invention, which is arranged on a dashboard of the motor vehicle, wherein the display device includes a liquid crystal display screen, which is assigned to at least one front passenger position, wherein the liquid crystal display screen is divided into a plurality of segments, wherein a respective segment includes an electronically switchable privacy device, which may be configured, in an activated state, to block a display of a display image of the respective segments from the viewing direction of a driver position and to permit the display from the viewing direction of the front passenger position and, in a deactivated state, to permit the display from both viewing directions, wherein the display device may be configured to determine the segments on which a moving entertainment display is displayed, and to activate the privacy device for these segments.

In other words, the motor vehicle comprises a display device which includes a liquid crystal display screen (LCD). The liquid crystal display screen typically comprises a backlight, which generates diffuse light, and a liquid crystal display layer, which can activate or deactivate individual pixels for a display via a polarization control of the light. The display device having the liquid crystal display screen may, for example, be assigned to the front passenger position, which means that the liquid crystal display screen is essentially arranged in front of the front passenger position. Thus, for example, at least 60% of the display screen surface can be arranged directly in front of the front passenger position.

The liquid crystal display screen can in an example be divided into multiple segments, wherein segments can mean electronically actuatable areas of the liquid crystal display screen. Each of these segments can comprise an electronically switchable privacy device, by which a display can be blocked from the viewing direction of the driver position. That is to say, the driver can only see a darkened image or no image in the respective segment when the privacy device is activated. This can in particular be achieved by a direction control of the light from the liquid crystal display screen. The privacy device is for example electronically switchable, which means that it can be activated and deactivated. In the deactivated state of the privacy device, a display image can thus also be perceived from the viewing direction of a driver position.

Since not all display images are to be hidden for a driver of the motor vehicle, it is provided that the display device can ascertain which segments display a moving entertainment display. An entertainment display content, for example, a movie or a game, which can be displayed on the display device for a front passenger. In particular moving entertainment displays can endanger traffic safety, since these can distract a driver from the road.

In an example, the entire liquid crystal display screen may be divided into the segments. This means that not only individual areas of the liquid crystal display screen include the segments. Thus, for example, each pixel of the liquid crystal display screen can be actuatable by the privacy device. Furthermore, the liquid crystal display screen can for example be formed over the entire dashboard.

The privacy device can for example be provided by a switchable collimator, which can parallelize light from the liquid crystal display screen and thus only emits a display from a predetermined direction. For this purpose, for example, arrangements of multiple layers of liquid crystals can be provided or a backlight of the liquid crystal display screen can be configured such that it emits this parallelized light.

The advantage results by way of the invention that the entire liquid crystal display screen does not have to be kept dark for the driver and, for example, all nonmoving contents, such as status lines, operating elements, a time of day, information, and/or a navigation display can be seen both by the front passenger and by the driver. The overall visual impression of the display device is thus retained better and large black areas can be avoided. Furthermore, a level of safety can be increased since no moving entertainment displays are displayed for the driver.

The invention also comprises embodiments, due to which additional advantages result.

One embodiment provides that the liquid crystal display screen includes, in addition to a liquid crystal display layer, at least one liquid crystal cell layer, in particular a TN cell layer ("twisted nematic" cell layer), as a privacy device, which is actuatable by segment and may be configured to collimate light beams in the viewing direction of the front passenger position when voltage is applied. In other words, the liquid crystal display screen can include a liquid crystal display layer which is used for the image control of the liquid crystal display screen. The liquid crystal display layer is prior art and is contained in every liquid crystal display screen. In addition to this liquid crystal display layer, the liquid crystal display screen includes as a privacy device a liquid crystal cell layer, which can be constructed according to the same principle as the liquid crystal display layer. In particular, this additional liquid crystal layer can be a TN cell layer (twisted nematic). For this purpose, two polarization filters, which are offset by 90° in relation to one another with their polarization direction, can enclose a layer of liquid crystal molecules, wherein the liquid crystal molecules can rotate the polarization direction of the light in dependence on a voltage applied to the liquid crystal molecules. A transmittance of the light of both polarizers can thus be controlled.

An additional effect of the liquid crystal cell layer is that an emission direction of light which passes the liquid crystal cell layer can be controlled in dependence on the applied voltage. That is to say, in a conventional LCD display screen, edge beams are attenuated in comparison to perpendicular beams and this effect can be amplified still further if further liquid crystal cell layers are arranged. An asymmetry can thus be generated, so that beams are minimized in the direction of the driver position. A further possibility for generating the privacy function is that the liquid crystal cell layer is switched so that a grid-shaped structure arises in the liquid crystal cell layer. In other words, the liquid crystal cell layer, in particular the TN cell layer, can be a layer opaque to light having individual holes switched to be transparent in the TN cell layer, wherein only parallel beams pass through the holes and lateral beams are largely filtered out. The advantage results due to this embodiment that primarily perpendicular beams are generated and lateral beams are blocked, in particular in the viewing direction of the driver position.

In an example, the at least one liquid crystal cell layer is arranged between a backlight of the liquid crystal display screen and the liquid crystal display layer of the liquid crystal display screen or on a surface of the liquid crystal display screen. A directional control of the light can be produced by these arrangements.

It may be provided that multiple liquid crystal cell layers, which are arranged one behind another and are aligned in relation to one another, are provided as the respective privacy device. In an example, two or three of these liquid crystal cell layers can be arranged one behind another, so that the edge beams in the viewing direction of the driver position are filtered out by at least 90%, for example, at least 95%. The advantage results due to this embodiment that an electrically controllable and space-saving privacy device can be provided, which is actuatable by segment.

A further embodiment provides that a backlight of the liquid crystal display screen for providing the privacy device is formed in two layers, wherein a first backlight layer may be configured to emit light diffusely, and wherein a second backlight layer may be configured to emit light in a collimated manner in the viewing direction of the front passenger position, wherein the two backlight layers may be configured to illuminate the respective segments separately, wherein in the activated state of the privacy device, only the second backlight layer emits light in the respective segment and the first backlight layer is deactivated in this segment. In a deactivated state of the privacy device, in an example, only the first backlight layer can emit light and the second backlight layer is deactivated. This means that the backlight of the liquid crystal display screen can emit at least two types of light in that two backlight layers are provided.

The first backlight layer emits diffuse light as is provided in normal operation of an LCD display screen. For this purpose, for example, light-emitting diodes can be provided as the backlight layer. The second backlight layer can emit light which is collimated in the viewing direction of the front passenger position. That is to say, essentially parallel light is emitted in the direction of the front passenger position. Therefore, only little or no light of the second backlight layer is emitted toward the driver position, by which a display can be blocked for a driver. The respective backlight layers are, for example, configured to illuminate the respective segments of the liquid crystal display screen separately and alternately. That is to say, in one segment in which the first backlight layer is activated, the second backlight layer is deactivated and vice versa. The privacy device can thus be activated for each segment in that only the second backlight layer emits light for the respective segment.

It is may be provided that the second backlight layer includes at least one collimator device. That is to say, at least one collimator device can be provided for providing a predetermined light direction. A light source, in particular an LED, can for example be provided in a focal point or a focal plane of a converging lens as a collimator device, by which the light beams are parallelized. Additionally or alternatively, a pinhole screen or a grid can be provided, by which a direction of the light can be predetermined. A light deflection via micro-prisms or other optical structures can also be provided as a collimator device. The collimator device can, for example, include a condenser, which can collect light beams and provide the collimator device in order to increase an intensity of the light signal. The advantage results due to this embodiment that a light deflection can be carried out directly at the backlight, by which a higher light intensity can be obtained for the privacy device.

In a further embodiment, it is provided that the segments are formed as horizontal and/or vertical stripes. In other words, the segments can be formed from one side of the display screen to the other side of the display screen and can cover the entire area of the display screen one over another and/or adjacent to one another. The advantage results due to this embodiment that a control of the segments and thus of the privacy devices can be housed in an edge of the display screen and thus a control of the privacy device can be simplified.

In a further advantageous embodiment, it is provided that the segments are formed as rectangles and/or rhomboids. That is to say, individual rectangular areas in the display screen are actuatable, which do not have to lie at the edge, but can be arranged within the display screen. Preferably, each pixel of the liquid crystal display screen can represent a rectangular segment. It can thus be controlled particularly accurately, in particular for each pixel, whether it is to be visible from the direction of the driver position or not.

A further embodiment provides that the display device may be configured to determine whether the motor vehicle is moving or stationary and/or whether the motor vehicle is operated manually or autonomously, and to activate the privacy device if the motor vehicle is moving and/or is manually operated and to deactivate the privacy device if the motor vehicle is stationary and/or is operated autonomously. In other words, the display device can check and decide whether the motor vehicle is moving or not and/or whether the motor vehicle is operated manually or autonomously. Since the privacy device may, for example, be provided to increase a level of driving safety for a driver, the privacy device can be activated if the motor vehicle is moving and the driver drives the motor vehicle manually. If the motor vehicle is at a standstill, the privacy device can be released for the moving entertainment displays. The moving entertainment displays can also be released by the privacy device in autonomous driving operation of the motor vehicle, so that the driver and a front passenger can view a moving entertainment display together, such as a movie. The advantage results due to this embodiment that a level of safety can be improved.

A further aspect of the invention relates to a method for activating a privacy device using a motor vehicle according to one of the preceding embodiments. The method comprises as steps determining whether the motor vehicle is driven in manual driving operation, determining segments of the display device on which a moving entertainment display is displayed, and activating the privacy device in the segments in which the moving entertainment display is displayed if the motor vehicle is driven in manual driving operation. The same advantages and possible variations result in this case as in the case of the motor vehicle.

The invention also includes the control device for the motor vehicle. The control device can include a data processing device or a processor device, which is configured to carry out an embodiment of the method according to the invention. The processor device can include at least one microprocessor and/or at least one microcontroller and/or at least one FPGA (Field Programmable Gate Array) and/or at least one DSP (Digital Signal Processor) for this purpose. Furthermore, the processor device can include program code which is configured to carry out the embodiment of the method according to the invention upon execution by the processor device. The program code can be stored in a data memory of the processor device.

The invention also includes refinements of the method according to the invention which include features as have already been described in conjunction with the refinements of the motor vehicle according to the invention. For this reason, the corresponding refinements of the method according to the invention are not described once again here.

The motor vehicle according to the examples of the disclosure may be an automobile, for example, a passenger vehicle or truck or a bus or motorcycle.

The examples of the disclosure may also comprise the combinations of the features of the described examples. The examples of the disclosure thus may also comprise implementations which each include a combination of the features of several of the described examples provided that the embodiments have not been described as mutually exclusive.

BRIEF DESCRIPTION OF DRAWINGS

Examples of the invention are described hereinafter. In the figures.

DESCRIPTION

The examples explained hereinafter are examples of the invention. In the examples, the described components each may represent individual features to be observed independently of one another, which each also refine the examples independently of one another. Therefore, the disclosure is also to comprise combinations of the features of the examples other than those illustrated. Furthermore, the described examples can also be supplemented by further ones of the above-described features.

In the figures, identical reference signs each designate functionally identical elements.

Figure 1:
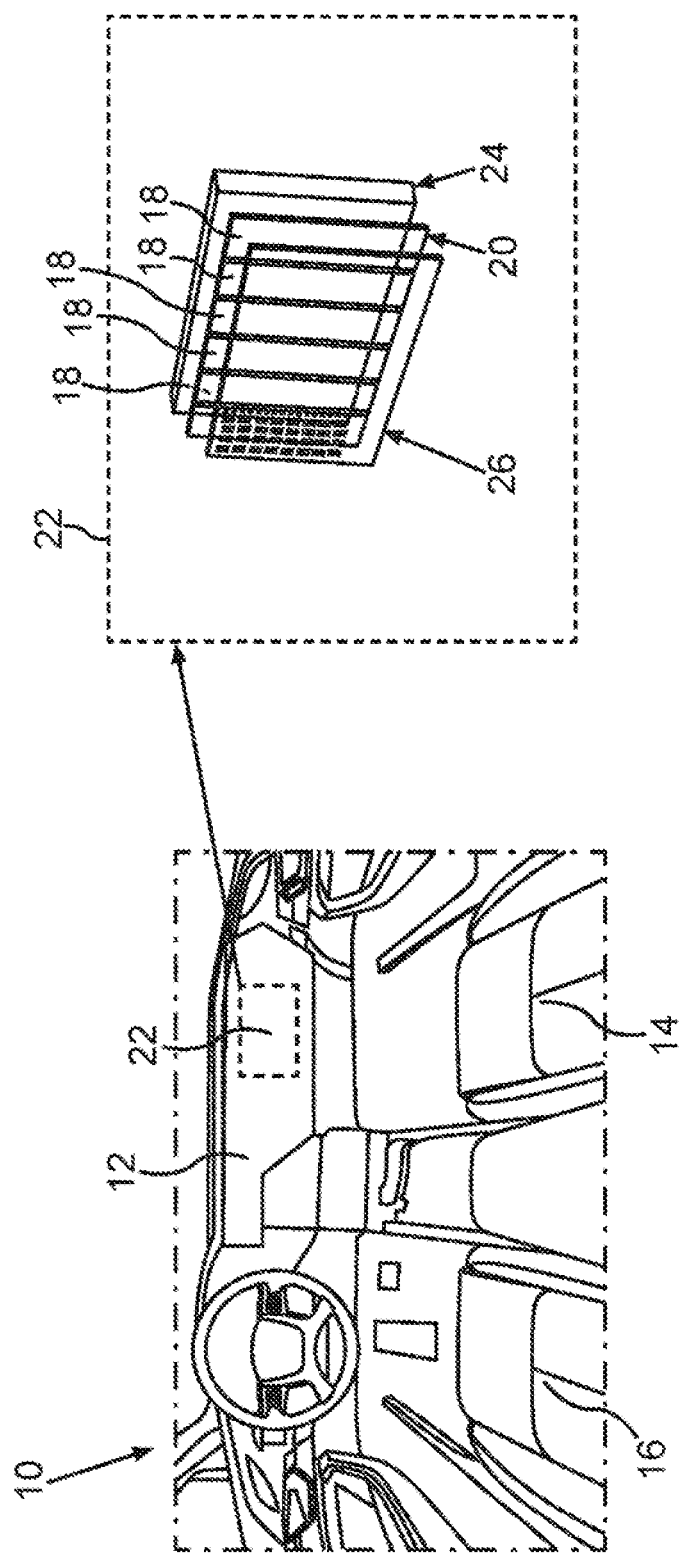
FIG. 1 shows a perspective illustration of a motor vehicle interior having a display device according to an example.

FIG. 1 shows a perspective view of a dashboard of a motor vehicle 10 having a display device 12 according to an exemplary embodiment. The display device 12 can be arranged on the dashboard of the motor vehicle 10, wherein the display device 12 is, for example, a liquid crystal display screen that covers a large part of the dashboard. The display device 12 can be, for example, assigned to a front passenger position 14, however. This means that more than 70% of a surface of the liquid crystal display screen may be arranged in front of the front passenger position 14.

Such a large-area display device 12 has the disadvantage, however, that a driver at a driver position 16 can be distracted by displays of the display device 12, by which a traffic safety of the motor vehicle 10 could be endangered. In particular moving entertainment displays, such as movies, can strongly distract attentiveness and are forbidden while driving in many countries.

To prevent such a distraction and nonetheless enable a moving entertainment display for a front passenger, it can be provided that the liquid crystal display screen is divided into multiple segments 18 and each of these segments 18 includes a switchable privacy device 20. The privacy device 20 can, for example, be configured to have at least two states, wherein in a deactivated state a display on the display device can be seen both from the driver position 16 and from the front passenger position 14 and in an activated state of the privacy device 20 it can only be seen from the viewing direction of the front passenger position 14. This means that light beams in the direction of the driver position 16 can be blocked in the activated state of the privacy device 20.

This is to be explained hereinafter on the basis of an example. A front passenger at the front passenger position 14 wishes, for example, to have a movie play on the display device 12, wherein they do not require the entire surface of the liquid crystal display screen for this purpose. In particular, a window size for displaying the movie can be set variably so that, for example, the movie is to be displayed on the section 22.

The section 22 of the liquid crystal display screen is shown for this purpose in a further schematic view for explanation, wherein the entire liquid crystal display screen can be constructed in the same manner. The liquid crystal display screen can include at least one backlight 24 and a liquid crystal display layer 26. The backlight 24 and the liquid crystal display layer 26 are typical components for a liquid crystal display screen here. The backlight 24 can be configured to generate a diffuse light signal and the liquid crystal display layer controls the transmittance of the individual pixels for this light in order to generate an image.

The privacy device 20, which can be configured in an example as an additional liquid crystal cell layer, in particular as a twisted nematic cell layer (TN cell layer), can be arranged between the backlight 24 and the liquid crystal display layer 26. This TN cell layer 20 can be divided into multiple segments 18, which are actuatable separately in order to block the viewing direction from the driver position 16. In this case, in particular the effect of liquid crystal cell layers or liquid crystal molecules can be utilized that depending on the applied voltage, an adjustment of the polarization and direction of the light takes place. When light passes through the liquid crystal cell layers, one or more directions of the light are attenuated. With suitable actuation of the liquid molecules using a voltage value, therefore in particular light can be attenuated in the viewing direction of the driver position. In an example, multiple liquid crystal cell layers 20 can be arranged one behind another and can be aligned so that the light in the direction of the driver position 16 at a predetermined applied voltage is reduced to an intensity of less than 1%.

In an example, the entire liquid crystal display screen of the display device 12 can be configured as described above so that depending on the selection of the size of the section 22, the display of this section 22 can be blocked for the driver. The display device 12 can, for example, be configured to determine those segments 18 which result in the section 22 of the liquid crystal display screen and which display the moving entertainment display, in order to block them in an automated manner for the driver. In particular, even after a size adjustment of the section 22, the privacy device 20 can thus be actuated variably so that only the moving entertainment display is blocked and the remainder of the display device still remains visible for the driver.

Figure 2:
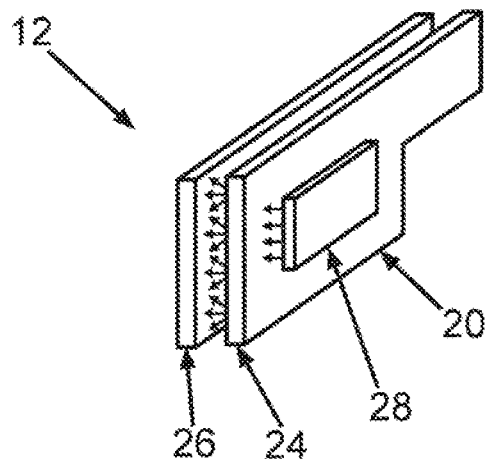
FIG. 2 shows a schematic illustration of a display device according to an example.

FIG. 2 shows a further exemplary embodiment for implementing the privacy device 20. In this embodiment, the display device 12 can include a two-layer backlight, in front of which the liquid crystal display layer 26 is arranged. A first backlight layer 24 can be configured like a normal backlight of a liquid crystal display screen for the purpose of emitting light diffusely. That is to say, the light can be emitted by the first backlight layer in all spatial directions. A second backlight layer 28 can be configured for the purpose of emitting light in a collimated manner in the viewing direction of the front passenger position 14. In order to collimate the light of the second backlight layer 28, a collimator device (not shown) can be provided, which includes, for example, a pinhole screen after a light source and in addition a converging lens, the focal point of which is located in the hole of the pinhole screen. A LCF (Light Control Film) can, for example, also be used as a collimator device. Light beams from the light source can therefore be parallelized and guided in a predetermined direction.

In order to change a state for a respective segment 18 using this embodiment, it can be provided that in the areas which are to be seen from the driver position 16, only the first backlight layer 24 is activated and the second backlight layer 28 can be deactivated for this area. In the segments in which the display for the driver position 16 is to be blocked, only the second backlight layer 28 can emit light and the first backlight layer 24 can be deactivated for this area. The light is therefore only emitted toward the front passenger position 14 and a display for a driver is dark in this segment.

Figure 3:
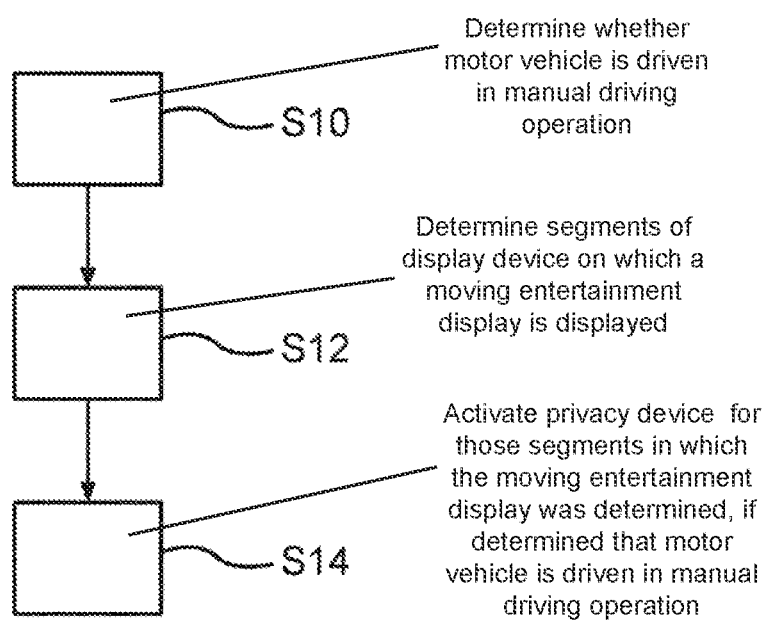
FIG. 3 shows a schematic method diagram according to an example.

FIG. 3 shows an exemplary method diagram for activating a privacy device 20 for a motor vehicle 10. In a step S10, it can first be determined whether the motor vehicle 10 is driven in manual driving operation. That is to say, it can be checked whether a driver controls the motor vehicle themself or whether a computer device of the motor vehicle 10 carries out autonomous driving operation. In a step S12, segments 18 of the display device 12 can then be determined on which a moving entertainment display is displayed. A position of the entertainment display on the liquid crystal display screen can thus be determined by the display device 12.

In a step S14, the privacy device 20 can then be activated for those segments 18 in which the moving entertainment display was established if it was determined that the motor vehicle 10 is driven in manual driving operation.

In a further exemplary embodiment, one aspect is that the display screen on the front passenger side 14 of the vehicle 10 can partially be switched into a privacy mode. That is to say, the display screen can be divided into areas (segments 18) in which a display from the direction of a driver side (driver position 16) can be restricted so that this area can no longer be seen by a driver (privacy mode).

Switching of the privacy mode can take place in a previously defined area of the LC display or also in multiple zones. These zones can, for example, by multiple LC cells, which are arranged between a backlight (backlight 24) and the LCD (liquid crystal display layer 26).

In this way, the entire display screen in the front passenger area does not have to be switched to black for the driver. All nonmoving contents such as status lines, operating elements, time of day, information, and so on can be seen both by the front passenger and by the driver. The overall visual impression of the dashboard is thus maintained better and large black areas are avoided.

To achieve this, the display screen can comprise a technology which can control a direction of the visible light of the display. This light orientation, may, for example, be switchable. Two states can be supported here. On the one hand, a "public mode" in which the display content is visible from a large angle. Both the driver and the front passenger can see a content on the display screen in this mode. On the other hand, a "privacy mode" in which the light of the display is emitted in a directed manner and in a narrow angle perpendicular to the display surface. The content of the display screen is only to be seen by the front passenger. No or little light is emitted in the direction of the driver, due to which the content is darkened very strongly.

The display may, for example, be divided into segments 18. Individual segments 18 thereof can be switched into the privacy mode, while other segments 18 still display the public mode. In an example, a larger area of the display is always in the public mode and only a partial area is in the privacy mode.

A technical solution can be produced using LC cells (liquid crystal), which are used especially for the direction of the light. One or more layered TN cells (twisted nematic) can be used as LC cells or as the LC cell stack, for example. The LC cells can be formed, for example, as whole-surface segments which are arranged horizontally and/or vertically or the LC cells can also have another geometric shape, for example, a rhomboid shape or a rectangle shape.

A further possible implementation is produced using a two-layer backlight 24, which can be switched into the privacy mode partially or in segments 18.

Overall, the examples show how partial privacy switching can be provided in displays by the invention.

A description has been provided with particular reference to examples, but it will be understood that variations and modifications can be effected within the spirit and scope of the claims, which may include the phrase "at least one of A, B and C" as an alternative expression that refers to one or more of A, B or C, contrary to the holding in *Superguide* v. *DIRECTV*, 358 F3d 870, 69 USPQ2d 1865 (Fed. Cir. 2004).

The invention claimed is:

1. A motor vehicle, comprising:
a display device, which is arranged on a dashboard of the motor vehicle and which is assignable to at least a front passenger position, the display device includes a liquid crystal display (LCD) screen and is divided into a plurality of segments;
each respective segment of the plurality of segments includes a privacy device which is electronically switchable and configured to:
in an activated state, block a display of a display image from a viewing direction of a driver position and to permit the display of the display image from a viewing direction of the front passenger position, and
in a deactivated state, permit the display of the display image from both the viewing direction of the driver position and the viewing direction of the front passenger position; and
the display device is configured to determine at least one segment of the plurality of segments on which a moving entertainment content is displayed, and to activate the privacy device for the at least one segment so that the at least one segment with the displayed moving entertainment content is in the activated state.

2. The motor vehicle as claimed in claim 1, wherein the LCD screen includes a plurality of LCD layers and at least one LCD layer, from among the plurality of LCD layers, is the privacy device, which is actuatable in segments and is configured to collimate light beams in the viewing direction of the front passenger position when voltage is applied.

3. The motor vehicle as claimed in claim 2, wherein the at least one LCD layer is a twisted nematic (TN) cell layer.

4. The motor vehicle as claimed in claim 2, wherein the LCD screen includes a backlight and the at least one LCD layer is arranged between the backlight and the LCD screen or the at least one LCD layer is on a surface of the LCD screen.

5. The motor vehicle as claimed in claim 2, wherein the at least one LCD layer includes multiple LCD layers, which are arranged one behind another and are aligned in relation to one another, as the privacy device.

6. The motor vehicle as claimed in claim 1, wherein the LCD screen includes a backlight that is formed in two layers to provide the privacy device,
a first backlight layer of the two layers is configured to emit light diffusely,
a second backlight layer of the two layers is configured to emit light in a collimated manner in the viewing direction of the front passenger position,
the first backlight layer and the second backlight layer are configured to illuminate each respective segment of the plurality of segments separately, and in the activated state of the privacy device, only the second backlight layer emits light in each respective segment of the plurality of segments and the first backlight layer is deactivated in other segments of the plurality of segments.

7. The motor vehicle as claimed in claim 6, wherein the second backlight layer includes at least one collimator device.

8. The motor vehicle as claimed in claim 1, wherein the plurality of segments are formed as horizontal and/or vertical stripes.

9. The motor vehicle as claimed in claim 1, wherein the plurality of segments are formed as rectangles and/or rhomboids.

10. The motor vehicle as claimed in claim 1, wherein the display device is configured to determine whether the motor vehicle is moving or stationary and/or whether the motor vehicle is operated manually or autonomously, and to activate the privacy device if the motor vehicle is moving and/or is manually operated, and to deactivate the privacy device if the motor vehicle is stationary and/or is operated autonomously.

11. A method of activating a privacy device of a display device, which is arranged on a dashboard of a motor vehicle, the display device including a liquid crystal display (LCD) screen divided into a plurality of segments, the method comprising:
determining whether the motor vehicle is being driven in a manual driving operation;
determining at least one segment of the plurality of segments of the display device, on which a moving entertainment content is displayed;
activating the privacy device in the at least one segment in which the moving entertainment content is displayed if the motor vehicle is being driven in manual driving operation so that the at least one segment with the displayed moving entertainment content is in the activated state.

* * * * *